United States Patent [19]
Coff et al.

[11] Patent Number: 5,944,322
[45] Date of Patent: Aug. 31, 1999

[54] COMBINATION GRAPHITE FOIL AND METAL SEALING GASKET

[75] Inventors: Shane J. Coff, Morro Bay; Alan C. Bettencourt, Solana Beach; Rodney A. Chambers, Rialto, all of Calif.

[73] Assignee: Parker-Hannifin Corporation, Cleveland, Ohio

[21] Appl. No.: 08/798,778

[22] Filed: Feb. 11, 1997

[51] Int. Cl.⁶ .................................................. F02F 11/00
[52] U.S. Cl. .......................................... 277/594; 277/938
[58] Field of Search ..................... 285/363, 910, 285/334.5, 332.2, 405, 413; 277/593, 594, 595, 611, 627, 938, 591

[56] References Cited

U.S. PATENT DOCUMENTS

| | | |
|---|---|---|
| 3,167,322 | 1/1965 | Aichroth . |
| 3,215,442 | 11/1965 | Papenguth . |
| 3,302,953 | 2/1967 | Glasgow . |
| 3,578,346 | 5/1971 | Jelinek . |
| 3,635,480 | 1/1972 | Bain et al. . |
| 3,737,169 | 6/1973 | Glynn . |
| 3,841,289 | 10/1974 | Meyers . |
| 3,942,807 | 3/1976 | Dinger . |
| 4,094,520 | 6/1978 | Ng et al. ................................. 285/363 |
| 4,243,231 | 1/1981 | Sugawara . |
| 4,519,619 | 5/1985 | Doyle . |
| 4,676,515 | 6/1987 | Cobb . |
| 4,690,438 | 9/1987 | Kanczarek . |
| 4,723,783 | 2/1988 | Belter et al. . |
| 4,756,561 | 7/1988 | Kawata et al. . |
| 4,795,166 | 1/1989 | Irmler . |
| 4,911,480 | 3/1990 | Bridges et al. . |
| 5,145,190 | 9/1992 | Boardman . |
| 5,222,744 | 6/1993 | Dennys . |
| 5,228,702 | 7/1993 | Browne et al. . |

(List continued on next page.)

FOREIGN PATENT DOCUMENTS

96/31724  10/1996  WIPO .

OTHER PUBLICATIONS

Copy of literature for Parker Seal Parmite Spirotallic Gaskets copyrighted 1985 by Parker–Hannifin Corporation, Parker Seal Group, Lexington, Kentucky.

Copy of literture for Parker Seal, Spirotallic Spiral Wound Gaskets copyrighted 1985 by Parker Hannifin Corporation, Parker Seal Group, Lexington, Kentucky.

Copy of Technical Handbook for Metallic Gaskets, copyrighted 1979 by Fluid Sealing Association, Inc., Metallic Gasket Division.

(List continued on next page.)

*Primary Examiner*—Anthony Knight
*Assistant Examiner*—Gary Grafel
*Attorney, Agent, or Firm*—John A. Molnar, Jr.

[57] ABSTRACT

A gasket assembly for interposition between a pair of axially spaced-apart interface surfaces of an internal combustion engine. The assembly includes a metal retainer member having generally planar first and second surfaces with one or more apertures formed therethrough. Each of the apertures are configured for generally coaxially registration with a corresponding fluid passageway formed through the interface surfaces of the engine as having a periphery defining a margin of an extent greater than the inner diameter of the corresponding fluid passageway. One or more generally annular seal members are each received within a corresponding one of the apertures as including a first and second radial surfaces. The radial surfaces, which define a bearing portion between interface surfaces of the engine, extend inwardly of the corresponding aperture from an outer diametric extent to an inner diametric extent which defines an opening of the assembly configured for generally coaxial registration with a corresponding one of the fluid passageways of the engine. Each of the seal members is formed of a layer of a lamellar graphite sheet material which is compressible axially in the bearing portion of the seal member between the interface surfaces for sealing about the corresponding fluid passageway of the engine.

26 Claims, 4 Drawing Sheets

U.S. PATENT DOCUMENTS

| | | |
|---|---|---|
| 5,333,919 | 8/1994 | Nerenberg . |
| 5,413,359 | 5/1995 | Latty . |
| 5,490,681 | 2/1996 | Plunkett et al. . |
| 5,516,124 | 5/1996 | Kubouchi et al. . |
| 5,518,280 | 5/1996 | Mann . |
| 5,524,906 | 6/1996 | Rackov et al. . |
| 5,531,454 | 7/1996 | Borneby . |
| 5,544,900 | 8/1996 | Aoki . |
| 5,558,344 | 9/1996 | Kestly et al. . |
| 5,628,113 | 5/1997 | Tanaka et al. ............................ 277/595 |
| 5,634,645 | 6/1997 | Seki et al. ................................ 277/627 |

OTHER PUBLICATIONS

Paper entitled "Flexible Graphite Non–Asbestos Gasketing Material," UCAR Carbon Company, Inc., presented at the Asbestos Substitute Gasket & Packing Materials Seminar, Aug. 6–7, 1986, Houston, Texas.

Diagram D5 Part Nos. 1404, 1405, 1444; Diagram D6 Part No. 1406; Diagram D7 Part No. 1407 and Diagram D9 Part No. 1409 of Chevrolet Small Block V8.

Sheet containing Miscellaneous Gaskets.

Parker Seals Catalog entitled "Spirotallic Spiral Wound Gaskets" copyrighted 1981.

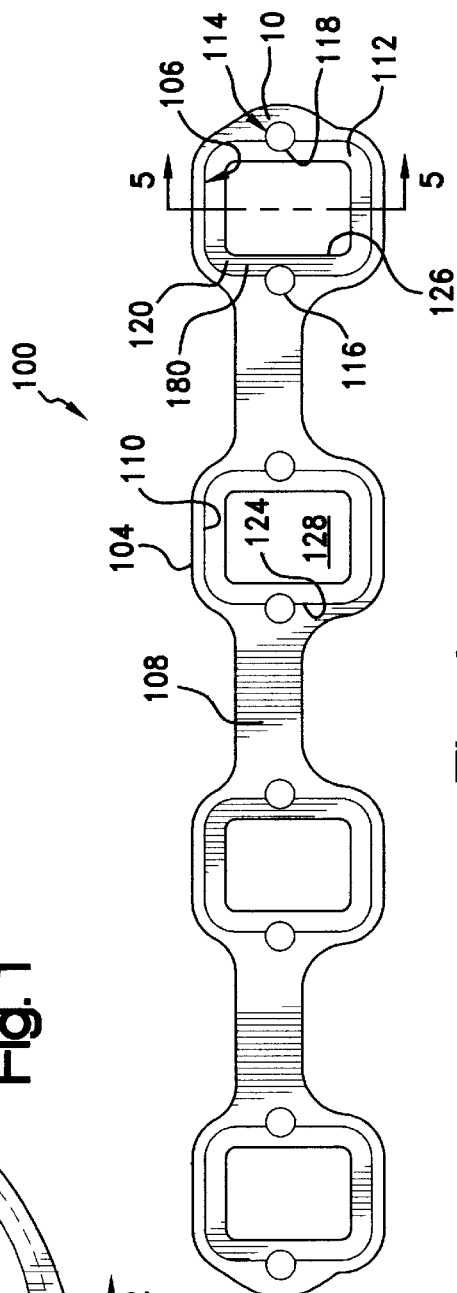
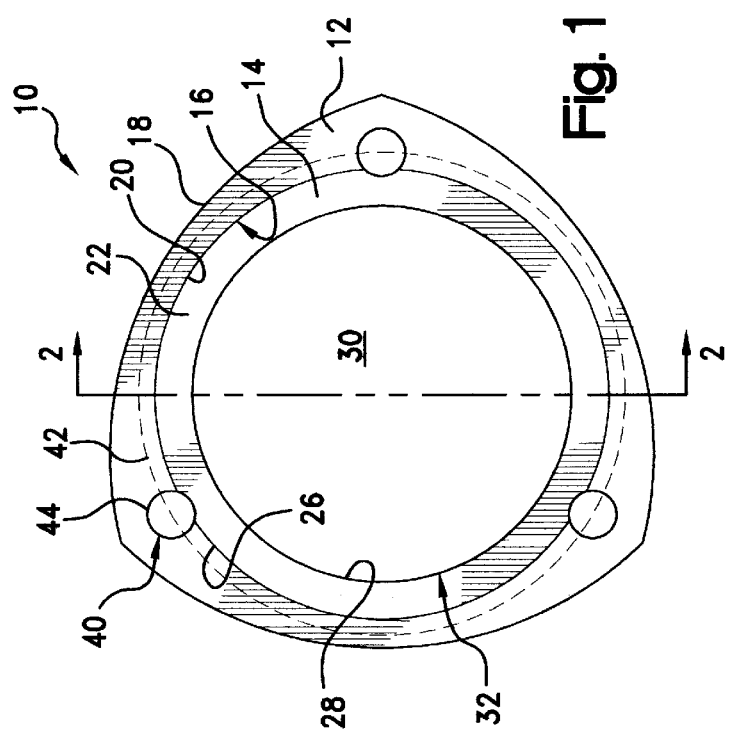

COMBINATION GRAPHITE FOIL AND METAL SEALING GASKET

BACKGROUND OF THE INVENTION

The present invention relates broadly to a sealing gasket for use within the exhaust system or the like of an internal combustion engine, and particularly to a gasket construction including one or more lamellar graphite seal members received within apertures formed in a metal retainer member.

Sealing gaskets of the type herein involved are employed in internal combustion engines as interposed for compression between certain mating surfaces of the engine for effecting the fluid-tight sealing thereof. For example, within the exhaust system of the engine, gaskets of such type are used to seal the interfaces between the connecting flanges of exhaust pipes, or between a header flange or other exhaust manifold and the cylinder head. In basic construction, these gaskets are conventionally formed as a generally planar member consisting of one or more layers of fiberboard, graphite, and/or a metallic material such as copper, steel, aluminum, or the like. Within the planar member are formed a plurality of apertures for registration with the fluid passageways of the exhaust pipes or cylinder head and manifold. Bolts or other fastening members typically are employed to develop compressive forces within the interface for securing the assembly into a fluid-tight joint.

A representative gasket for use in a flange-type pipe coupling is disclosed in Glasgow, U.S. Pat. No. 3,302,953. The gasket includes an outer metal ring portion having a plurality of peripherally-spaced bolt hole apertures and a central fluid passageway. A pair of diverging, annular sealing lip portions are provided to extend inwardly from the innermost edge of the outer ring portion to form an inwardly-facing annular groove. A resilient sealing ring formed of a synthetic rubber material or the like is molded within the groove to provide a low pressure seal. As interposed between a pair of pipe flanges, the sealing lip portions of the outer ring are compressed to provide a high pressure seal and to prevent the extrusion of the resilient sealing ring.

Meyers, U.S. Pat. No. 3,841,289, discloses a composite cylinder head gasket for an internal combustion engine which includes a metal sheet. On either side of the metal sheet is coated a layer of a sealant. The sealant is preferably formed of a laminated graphite sheet or foil having a density which is substantially less than its fully compressed density. Upon the installation of the gasket between opposing surfaces of the cylinder head and block of the engine, the tightening of the head bolts to a desired torque compresses the gasket such that portions of the graphite material are compressed to a maximum density.

Dinger, U.S. Pat. No. 3,942,807, discloses a sealing arrangement between a cylinder crankcase and a cylinder head. A seal for the arrangement is constructed as having an outer flat metal portion to which is bonded an inner elastic seal ring or liner of a vulcanized rubber or the like.

Sugawara, U.S. Pat. No. 4,243,231, discloses a cylinder head gasket which includes a base sheet having a plurality of holes with a cut-out area adjoining the holes. Within the cut-out area is mounted a graphite sheet which is described to resist deterioration within the narrow area between the adjoining holes.

Kanczarek, U.S. Pat. No. 4,690,438, discloses a gasket construction including an incompressible base portion formed of a pair of concentric rings having a slot therebetween. Within the slot is disposed a soft-material insert formed of expanded graphite.

Kawata et al., U.S. Pat. No. 4,756,561, discloses a gasket for use between connecting flanges in exhaust system of an engine. The gasket is constructed of a pair of thin metal sheets between which is interposed an intermediate layer formed of a blend of ceramic fibers and a thermally-expandable filler material such mica or vermiculite particles. A gas passage aperture is formed through the center of the gasket, with bolt holes being formed on opposite sides thereof. An annular metal insert member optionally may be provided about the bolt holes to support the bolt tightening forces such that the bolts may be torqued without developing excessive pressure on the intermediate layer. In operation within the engine, the heat transported with the exhaust gas effects a thickness expansion of the intermediate layer, which expansion is relieved as the intermediate layer contracts upon cooling.

Dennys, U.S. Pat. No. 5,222,744, discloses a sealing gasket for a flanged pipe coupling which includes a packing of expanded graphite disposed between an inner and outer metal reinforcement rings. The two rings are oriented on different planes prior to clamping between the pipe flanges, with the graphite packing being made to be applied against the bearing surfaces of the flanges. As the flanges are clamped, opposing forces are developed which effect the compression of the packing.

Latty, U.S. Pat. No. 5,413,359, discloses a gasket which includes an inner annular metal core, and an outer compressible ring of an expanded graphite material. The metal core has a circular recess on an outer circumference thereof which is provided in the form of a V-shaped trough. The gasket ring is inserted in the recess in alignment with the core.

Borneby, U.S. Pat. No. 5,531,454, discloses a laminated cylinder head gasket. The laminate is formed of an inner layer of a metal plate interposed between outer layers of an expandable graphite material. The graphite material is a mixture of expanded and unexpanded graphite which, upon heating, expands to create an outward pressure that is stated to improve the sealing ability of the gasket.

Header and header collector or exhaust pipe flange gaskets are marketed commercially by Mr. Gasket of Cleveland, Ohio. Such gaskets include a single-layer construction of a fiberboard material, and a laminated construction having a metal core. Gaskets of such type, which may additionally include a non-stick coating are also manufactured by Fel-Pro of Skokie, Ill.

The above-described references heretofore have constituted the state of the art with respect to cylinder head and collector gaskets. With respect to gaskets conventionally constructed of a fibrous or other relatively soft material, it will be appreciated, however, that the total compressive forces developed within the interface must be supported by such material. Over time and under repeated thermal cyclings, certain of these materials may have a tendency to develop a compression set which, in turn, may result in a loss of torque within the fastening members and a loosening of the joint. Moreover, as no positive means typically is provided in such gaskets to delimit or otherwise control the compression of the gasket, the gaskets may be over-compressed during installation or maintenance which again leads to the development of a compression set within the gasket.

In view of the foregoing, it is apparent that continued improvements in such gaskets would be well-received by the automotive industry for use as original and replacement equipment in passenger cars, and by enthusiasts for use in racing and other high performance applications. A preferred gasket construction would be economical to manufacture, but would exhibit excellent sealing with a minimum of compression set and resultant torque loss. Such a gasket additionally would be capable of withstanding prolonged exposure to high temperatures as well as to hydrocarbons and other fluids within the rigorous service environment of an internal combustion engine.

BROAD STATEMENT OF THE INVENTION

The present invention is directed to a sealing gasket for use as, for example, an exhaust pipe flange or manifold seal between interface surfaces within an internal combustion engine. The gasket includes a metal retainer member having one or more apertures which define fluid port openings, and one or more annular seal members each received in a corresponding one of the apertures. The seal members are formed of a layer of a lamellar graphite sheet material, i.e., laminated foil, which is compressible in a fluid-tight sealing arrangement to conform to any asperities or other irregularities between the interface surfaces of the engine with a minimum of compression set. The compression of the seal member advantageously is delimited to an optimum thickness by the thickness of the metal retainer member. The metal retainer additionally provides for direct metal-to-metal contact between the interface surfaces to accommodate the development of high tensile stresses, with a minimum of torque loss from thermal cycling, in the bolts or other fastening members used to couple the interface surfaces into a joint assembly.

It therefore is a feature of the present invention to provide a sealing assembly for interposition between a pair of axially spaced-apart interface surfaces within an internal combustion engine. The assembly includes a metal retainer member having generally planar first and second surfaces with one or more apertures formed therethrough. Each of the apertures are configured for generally coaxial registration with a corresponding fluid passageway formed through the interface surfaces of the engine as having a periphery defining a margin of an extent greater than the inner diameter of the corresponding fluid passageway. One or more generally annular seal members are each received within a corresponding one of the apertures as including first and second radial surfaces. The radial surfaces, which define a bearing portion of the seal member, extend inwardly of the corresponding aperture from an outer diametric extent to an inner diametric extent defining an opening of the assembly configured for generally coaxial registration with a corresponding one of the fluid passageways of the engine. Each of the seal members is formed of a layer of a lamellar graphite sheet material which is compressible axially in the bearing portion of the seal member between the interface surfaces for sealing about the corresponding fluid passageway of the engine.

It is a further feature of the invention to provide for the fluid-tight sealing of a joint assembly within an internal combustion engine. The assembly includes a first interface surface of the engine having one or more fluid ports, and a mutually-facing second interface surface of the engine which is spaced-apart axially from the first interface surface and which has one or more fluid ports. Each of the fluid ports of the first and second interface surfaces is disposed in registration with a corresponding one of the fluid ports of the other interface surface for defining fluid passageways of given inner diameters therethrough. A gasket member is interposed between the first and second interface surfaces as including a metal retainer and one or more generally annular seals. The retainer has generally planar first and second surfaces with one or more apertures formed therethrough. Each the apertures is configured for generally coaxial registration with a corresponding one of the fluid passageway of the engine as having a periphery defining a margin of an extent greater than the inner diameter of the corresponding fluid passageway. The radial surfaces, which define a bearing portion between the interface surfaces of the engine, extend radially inwardly of the corresponding aperture from an outer diametric extent to an inner diametric extent which defines an opening of the assembly registered coaxially with a corresponding fluid passageway of the engine. Each of the seals is formed of a layer of a lamellar graphite sheet material which is compressed in the bearing portion between the interface surfaces effecting a fluid-tight sealing about the corresponding fluid passageway of the engine.

Advantages of the present invention include a combination metal and lamellar graphite sealing gasket which exhibits improved sealing properties and torque retention with a minimum of compression set. Additional advantages include a gasket which is economical to manufacture, and which is capable of withstanding prolonged exposure to the high temperatures and thermal cyclings, high pressures, and fluids such as hydrocarbons found within the rigorous service environment of an internal combustion engine. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 1 is a plan view of one embodiment of a combination metal and graphite gasket according to the present invention which is shown as having a metal retainer member within which is received an annular seal member insert formed of a lamellar graphite material;

FIG. 4 is a plan view of another embodiment of a combination metal and graphite gasket according to the present invention which is shown has having a metal retainer member within which is received a plurality of annular seal member inserts;

Figure 2:
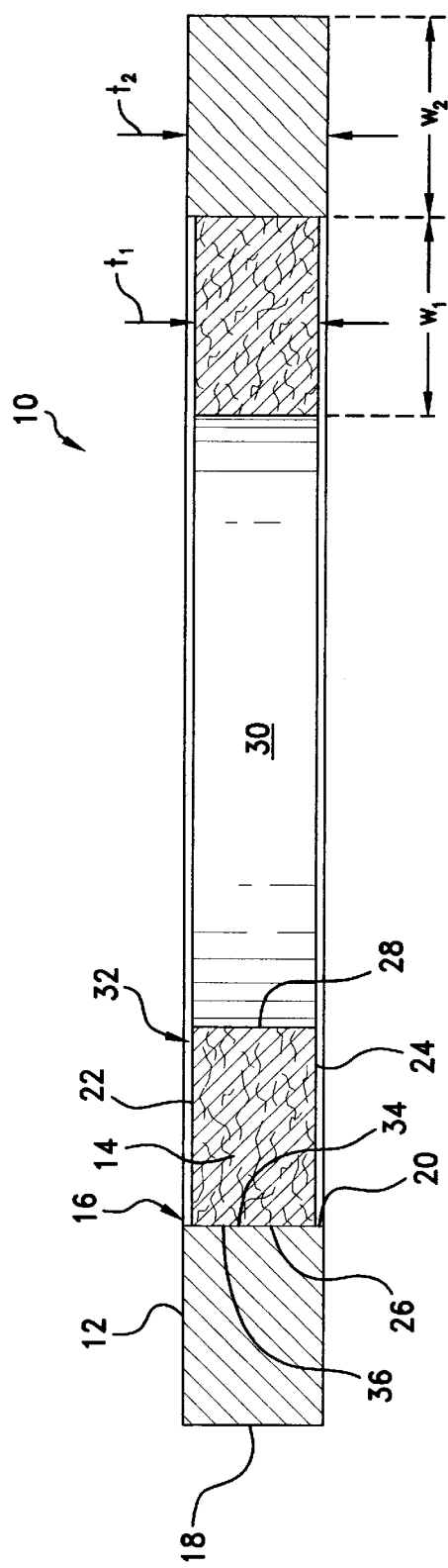
FIG. 2 is an enlarged, cross-sectional view of the gasket of FIG. 1 taken through line 2—2 of FIG. 1.

The drawings will be described further in connection with the following Detailed Description of the Invention.

DETAILED DESCRIPTION OF THE INVENTION

Referring then to the figures wherein corresponding reference characters are used to designate corresponding elements throughout the several views, shown generally at 10 in FIG. 1 is representative embodiment according to the present invention of a combination metal and graphite sealing gasket adapted for use within the exhaust system of an internal combustion engine. In the illustrated embodiment, gasket 10 is shown as configured for interposition between the confronting interface surfaces of a pair of connecting flanges as having a generally planar, metal retainer member, 12, and at least one seal member, 14, received within an aperture, 16, of the retainer member.

As is described further in U.S. Pat. No. 4,756,561, in basic construction, the exhaust system of an internal combustion engine typically includes an inboard exhaust pipe which is adapted at one end for fluid connection with the exhaust manifold of the engine cylinder head block. The other end of the pipe conventionally is configured as a flange for connection with an opposing connecting flange of an upstream end of a catalytic converter. In turn, the other, downstream end of the converter is configured as another flange for connection with an opposing flange of an outboard tailpipe or other exhaust pipe. Each of the interface surfaces of these connecting flange assemblies have one or more fluid ports therethrough which are disposed in registration with a corresponding one of the fluid ports of the confronting interface surface of the opposing flange for defining the tubular fluid flow passages of the exhaust system. For each assemblies, one or more bolts or other fastener members are provided as received through holes formed into the periphery of the flanges for the connection of the assembly.

Gasket 10 is interposable between, for example, the connecting flanges of the exhaust pipe and catalytic converter, the catalytic converter and the tail pipe, or one exhaust pipe such as a collector pipe and another exhaust pipe such as a reducer for effecting a fluid-tight sealing of the fluid flow passages thereof. In this regard, retainer member 12 preferably is formed as having a generally cycloidic outer geometry, 18, which corresponds to the outer extents of the interface surfaces to be sealed. Aperture 16 preferably is of a generally circular configuration for coaxial registration with a corresponding, tubular fluid passageway of the surfaces. That is, aperture 16 has a periphery, 20, which defines a margin of an extent which is greater than the inner diameter of the corresponding fluid passageway. It will be appreciated, however, that the configuration of the outer geometry of the retainer member 12, as well as the number, arrangement, and configuration of the apertures 16 formed therethrough, may vary depending, respectively, upon the configuration, number, or arrangement of the fluid passageways or the interface surfaces of the associated connecting flange assembly.

Looking additionally to FIG. 2 wherein the details of the gasket construction of the present invention are revealed via the enlarged cross-sectional view shown, it may be seen that seal member 14 is received as a generally annular insert within retainer member aperture 16. For effecting the fluid-tight sealing of the engine fluid passageway corresponding therewith, seal member 14 is provided as having first and second radial surfaces, 22 and 24, respectively, extending radially inwardly of aperture 16 from an outer diametric extent, 26, of the seal member to an inner diametric extent, 28, of the seal member which defines an opening, referenced at 30, of assembly 10. Although opening 30 is shown in FIG. 1 to be of a circular geometry for generally coaxial registration with a tubular flow passageway of the engine, it will be appreciated that other geometries of opening 30 may be envisioned depending upon the configuration of the corresponding fluid passageway. As will be appreciated hereinafter, radial surfaces 22 and 24 define a generally circumferential continuous bearing portion, referenced at 32, of seal member 10. Depending upon the application, radial surfaces 22 and 24 are provided to define a seal member width, referenced at "$w_1$," which is effective for sealing about the periphery of the engine passageways. Typically, such width $w_1$ will be from about ⅛ to ¼-inch, and will define opening 30 to be of a diametric extent which corresponds to or is marginally smaller than the inner diameter of the fluid passageway to ensure a complete sealing thereof. Retainer member 12 may be of any nominal width, referenced at "$w_2$," as depending upon the dimensions of the interface surfaces being sealed, but typically will be at least about ⅛-inch for supporting the seal member.

In accordance with the precepts of the present invention, each of seal members 14 is provided to be formed of a layer of a lamellar graphite sheet material which is compressible axially in bearing portion 32 between the interface surfaces for sealing about the corresponding fluid passageway of the engine. The material is formed as a consolidated laminate of a plurality of mechanically-interlocked, thin graphite foil sheets. By "compressible," it is meant that the material may be compacted under force by about 20–50% in axial thickness from an uncompressed density of about 70–90 lb/ft³ to a compressed density of about 95–125 lb/ft³. Advantageously, such material, which is also known as "flexible graphite," exhibits the thermal stability and chemical resistance of graphite, as well as the complementary properties of flexibility, compactability, conformability, and resilience. In particular, the resilient behavior of the material, which is characterized as exhibiting a recovery, i.e., hysteresis or "spring-back," to a thickness which is between its no-load and under-load thickness. Such behavior, in conjunction with a low creep relaxation maintaining a prescribed compressive load under a service pressure with minimal compression set, provides an effective sealing material having an inherent stability under a wide temperature range.

The lamellar graphite sheet material of the type herein involved is described further in "Flexible Graphite Non-Asbestos Gasketing Material," UCAR Carbon Company, Inc., paper presented at the Asbestos Substitute Gasket & Packing Materials Seminar, Aug. 6–7, 1986, Houston, Tex. The material is marketed commercially under the name "GRAFOIL®" by UCAR Carbon Company, Parma, Ohio.

Individual seal members 14 may be fabricated by die-cutting sheets of the laminate to the thickness of the final part. Alternatively, the individual seal members 14 may be formed in a mold to a net-shaped part. Assembly of gasket 10 may be had by inserting each of the seal members 14 so formed into a corresponding aperture 16 of retainer member 12. Preferably, the seal members are sized to be press or interference-fit within the aperture. In this regard, and as may be seen best in FIG. 2, at least a portion of periphery 20 of the corresponding aperture 16 and at least a portion of the outer diametric extent 26 of the seal members 14 define, respectively, mutually-facing inner and outer surfaces, 34 and 36, which may be generally annular or cylindrical. The outer surface 36 of the seal members thereby may be interference fit within the inner surface 34 of the retainer member. Although outer periphery 20 of aperture 16 is shown in FIG. 1 to have a generally circular geometry for receiving the circular geometry of the outer diametric extent 26 of seal member 14, as is shown hereinafter, other closed geometries such as polygonal, elliptical, and the like may be substituted without departing from the scope of the invention herein involved. The inner diametric extent 28 of seal member 14 also may be of the same geometry, as is shown, or of a different geometry as the outer diametric extent 26.

The tolerances between the inner and outer surfaces 34 and 36 need not be especially close as the compression of seal member 14 between the interface surfaces of the engine will, in operation, hold the seal in place within the corresponding aperture 16 of retainer member 12. To facilitate the installation of the assembly 10 within the engine, however, the outer surface 36 of the seal member may be adhesively bonded to the inner surface 34 of the retainer member with, for example, a rubber-based contact cement. Although a higher-temperature adhesive may be substituted, it is contemplated that the adhesive will be consumed by the heat of the engine, with the seal member thereafter being retained within the aperture in a compressive, interference fit.

Retainer member 12 may be formed as a metal stamping with one or more apertures 16 being die cut therein. Metal materials suitable for the construction of retainer member 12 include aluminum, steel, stainless steel, copper, brass, titanium, nickel, and alloys thereof, with aluminum being preferred for many applications.

The gasket assembly design of the present invention advantageously facilitates the provision of different thicknesses of seal member 14 to accommodate the specific configuration of the interface surfaces being sealed. For example, as is shown in FIG. 2, seal member 14 is provided as having a nominal axial cross-sectional thickness, referenced at $t_1$, that is from about 5–10 mils thinner than the corresponding nominal axial cross-sectional thickness, referenced at $t_2$, of retainer member 12. Depending upon its material of construction, retainer member 12 typically will be provided as having a thickness $t_2$ of from about 50–125 mils, with seal member 14 being provided as having a corresponding thickness $t_1$ of from about 40–110 mils sufficient to be elastically compressible between the interface surfaces of the engine for effecting a fluid-tight sealing of the corresponding engine passageway.

Returning to FIG. 1, retainer member 12 may be seen to be additionally formed as including one or more throughbores, one of which is referenced at 40. Throughbores 40 are arranged about the reference circle shown at 42, for receiving the bolts or other fasteners therethrough which are conventionally employed for coupling the associated connecting flanges under a predetermined amount of torque. In this regard, as registered intermediate the interface surfaces of the flanges, gasket 10 of the present invention is compressible under the torque of the bolts or other fastening members to effect a fluid tight sealing of the corresponding fluid passageways of the flanges. That is, seal members 14 exhibit a reduced yield stress as compared to metal retainer member 12 and, accordingly, are deformable for conforming to any irregularities between the interface surfaces of the engine. As will be more fully appreciated hereinafter, as a given compressive load is applied by the tightening of the bolts which fasten the interface surfaces of the flange assemblies, an increased bearing stress is provided about the fluid passageways of the engine by virtue of the reduced surface area contact of bearing portion 22 of the seal member on the interface surfaces. This increased stress is sufficient to exceed the reduced yield stress of seal members 14 for the deformation thereof effecting the fluid-tight sealing of the engine passageways.

Depending upon the configuration and the relative dimensions of the retainer and seal members, gasket member 10 may be constructed such that a portion, referenced at 44 for throughbore 40, of each of the throughbores is defined by the outer margin 20 of retainer member aperture 16, with the remainder thereof, referenced at 46, being defined by the outer diametric extent 26 of seal member 14. Advantageously, such construction concomitantly effects a fluid-tight of the throughbores sealing by virtue of the compression of seal member 14 between the interface surfaces of the connecting flange assembly.

Figure 3:
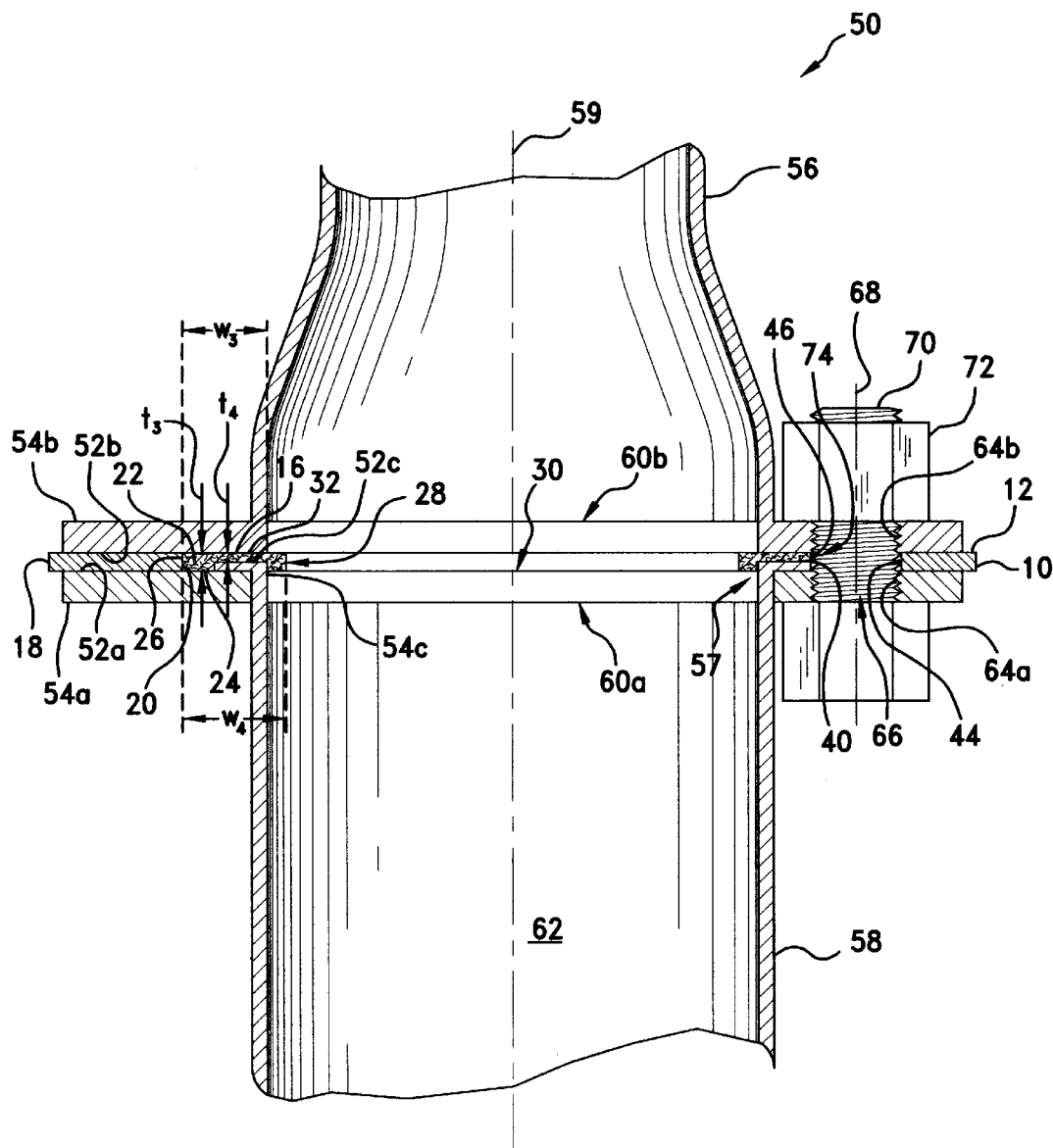
FIG. 3 is fragmentary, enlarged, cross-sectional view showing the gasket of FIG. 1 as interposed between the interface surfaces of a pair of connecting pipe flanges within the exhaust system of an internal combustion engine.

Referring next to FIG. 3, shown generally at 50 is an cross-sectional view of a representative joint assembly within the exhaust system of an internal combustion engine. Within joint assembly 50, gasket 10 of the present invention is shown as compressed between a pair of mutually-facing, axially spaced-apart interfaces surfaces, 52a and 52b, which are presented by the corresponding connecting flanges, 54a and 54b, of an exhaust reducer pipe, 56, and collector pipe assembly, referenced at 57. From another connecting flange, 54c, collector pipe assembly 57 additionally presents, a third interface surface, 52c, interposed between surface 52a and gasket 10. Flange 54c, which extends to define a collector pipe, 58, of assembly 57, is concentrically received within flange 54a to form a flared connecting flange arrangement which opposes the planar flange 54b.

Conventionally, collector pipe 58 may extend along longitudinal axis 59 upstream from its flanged end 54a to a fluid connection with a header or other exhaust manifold (not shown), with reducer pipe 56 extending downstream along longitudinal axis 59 from its flanged end 54b to a fluid connection with a tailpipe assembly or the like. Each of the interface surfaces 52 is formed as having at least one fluid port opening, referenced respectively at 60a and 60b, disposed in registration with a corresponding one of the fluid ports of the other interface surface for defining a fluid passageway, reference at 62, of the exhaust system. Fluid passageway 62 is of nominal inner diameter and extends along longitudinal axis 59 through pipes 56 and 58.

Additionally defined within each of interface surfaces 52 are plurality of bores, one of which is referenced at 64a for flange 54a and at 64b for flange 54b, disposed adjacent fluid passageway 62. Each of the bores 64 of each flange 54 is in alignment with a corresponding bore of the other flange 54 to define a hole, one of which is referenced at 66 as extending along axis 68, configured to receive an associated fastening member, which is illustrated as a threaded bolt, 70, having an associated nut, 72. Bolts 70, as was aforementioned, connect flanges 54 and are tightened to a predetermined torque to effect the compression of gasket 10 in a sealing engagement between interface surfaces 52. As is shown for the throughbore referenced at 40, each of the throughbores of gasket 10 are disposed about bolt circle 42 thereof (FIG. 1) to be in coaxial registration with a corresponding one of the fastener member holes 66 for receiving one of the fastener members 70 therethrough. As is shown at 74, with gasket 10 being compressed between the interface surfaces 52 of flanges 54, a fluid-tight sealing of bolt hole 66 is effected by virtue of the portion 46 of throughbore 40 being defined by the outer diametric extent 26 of seal member 14. Moreover, with a portion 44 of the throughbore being defined by metal retainer member 12, a positive stop is provided delimiting the compression of seal member 14 to thereby avoid the over-compressed thereof during installation or maintenance.

Gasket 10 is disposed between interface surfaces 54 with gasket opening 30 in general coaxial registration with the corresponding fluid passageway 62 of the engine. Upon the tightening of bolts 70 to a predetermined torque, seal member 14 is compressed between interface surfaces 52 to a thickness, referenced at $t_3$, which is equal to the thickness $t_2$ of retainer member 12, or to a thickness, referenced at $t_4$, which is equal to the thickness of the retainer member less the thickness of third flange 54c. It will be appreciated that the periphery 20 of aperture 16 is sized to extend outwardly of the inner diameter of fluid passageway 62 to define bearing portion 32 of seal member 14 as having a width, referenced at "$w_3$," which extends intermediate the inner diameter of fluid passageway 62 and the periphery 20 of aperture 16. As is shown, the compressed width under load, referenced at "$w_4$," of seal member 14 may extend slightly inwardly of the inner diameter of passageway 62 to ensure a continuous, fluid-tight sealing thereof.

The combination of a metal retainer member 12 and graphite seal members 14 advantageously provides a gasket construction which minimizes torque loss and thereby obviates much of the need for the periodic retorquing of the fastening members of the joint. That is, it is well-known that gaskets of the type herein involved are prone to developing a compression set which is manifested by fluid leaks and/or a loss of engine compression and efficiency as the tension in the bolts is relaxed and the fluid-tight sealing of the fluid passageways is compromised. In this regard, the provision of seal members 14 ensures the positive sealing of the fluid passageways, with metal retainer member 12, in turn, synergistically providing metal-to-metal contact in establishing an alternative load torque path minimizing the compression set and leak potential of the gasket. The metal-to-metal contact provided by retainer member 12 additionally affords improved heat transfer between the interface surfaces of the engine, and also develops relatively high seal stresses for the fluid-tight sealing of the fluid passageways.

Looking next to FIG. 4, another representative embodiment of gasket 10 of the present invention is shown generally at 100 as configured for interposition between a header flange, or other exhaust manifold, and the cylinder head of an internal combustion engine. In this embodiment, retainer member 102 is formed as having a generally elongate, outer geometry, 104, which corresponds to the outer extents of the interface surfaces to be sealed. A plurality of apertures, one of which is referenced at 106, are formed within retainer member 102, and are joined by a corresponding number of elongate connecting portions, one of which is referenced at 108. Each of apertures 106 are formed as having a generally rectangular or other polygonal geometry which, as before, is configured for coaxial registration with a corresponding fluid passageway of the surfaces. That is, each aperture 106 again has a periphery, 110, which defines a margin of an extent which is greater than the inner diameter of the corresponding fluid passageway. A graphite seal member, one of which is referenced at 112, likewise is received within each aperture 106.

Retainer member 102 may be seen, as before, to be additionally formed as including one or more throughbores, one of which is referenced at 114 for receiving the bolts or other fasteners therethrough which are conventionally employed for coupling the exhaust manifold to the cylinder head under a predetermined amount of torque. Again, a portion, referenced at 116 of throughbore 114, of each of the throughbores is defined by the outer margin 110 of retainer member aperture 106, with the remainder thereof, referenced at 118, being defined by the outer diametric extent 118 of seal member 112. Advantageously, such construction concomitantly effects a fluid-tight of the throughbores sealing by virtue of the compression of seal member 112 between the interface surfaces of the connecting flange assembly.

Figure 5:
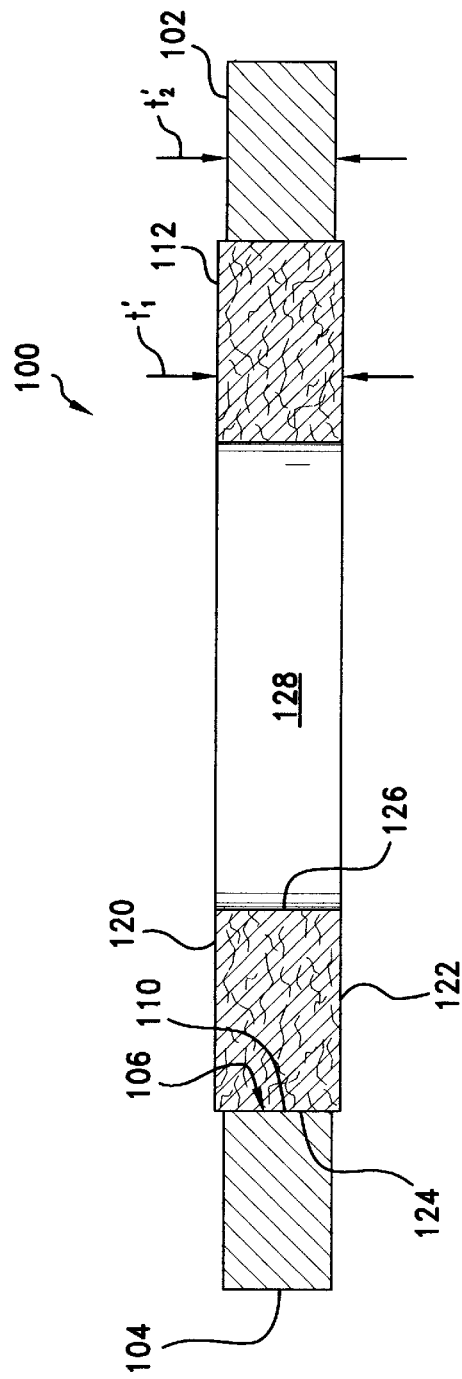
FIG. 5 is an enlarged, cross-sectional view of the gasket of FIG. 4 taken through line 5—5 of FIG. 1.

Looking additionally to FIG. 5 wherein the details of the gasket construction of the present invention are revealed via the enlarged cross-sectional view shown, it may be seen that each corresponding seal member 112, is received as a generally annular insert within each retainer member aperture 106. Again, for effecting the fluid-tight sealing of the engine fluid passageway corresponding therewith, each seal member 112 is provided as having first and second radial surfaces, 120 and 122, respectively, extending radially inwardly of aperture 106 from an outer diametric extent, 124, of the seal member to an inner diametric extent, 126, of the seal member which defines a generally rectangular opening, referenced at 128, of assembly 100.

For gasket 100 of the invention to acceptably seal the interface surfaces of the engine, a fraction of the load imposed on the gasket under the applied compressive forces developed from the torquing of the head bolts must be distributed in each of the sealing zones of the gasket to achieve an optimum load balance of the sealing. That is, while under compressive loading, it is preferred that seal members 112 are preloaded for an ultimate compression to the thickness of retainer member 102. In this regard, and as was detailed hereinbefore in connection with embodiment 10, the gasket assembly design of the present invention advantageously facilitates the provision of different thicknesses of seal member 112 to accommodate this preloading irrespective of the specific configuration of the interface surfaces being sealed. For example, seal member 112 may be provided as is shown in FIG. 5 for generally planar interface surfaces as having a nominal axial cross-sectional thickness, referenced at $t_1'$, that is from about 0–60 mils thicker than the corresponding nominal axial cross-sectional thickness, referenced at $t_2'$, of retainer member 102.

Depending, again, upon its material of construction, retainer member 102 typically will be provided as having a thickness $t_2'$ of from about 50–125 mils. Seal member 112 therefore may be provided as having a corresponding thickness $t_1'$ of from about 50–150 mils which is sufficient to be elastically compressible between the interface surfaces of the engine for effecting a fluid-tight sealing of the corresponding engine passageway.

Figure 6:
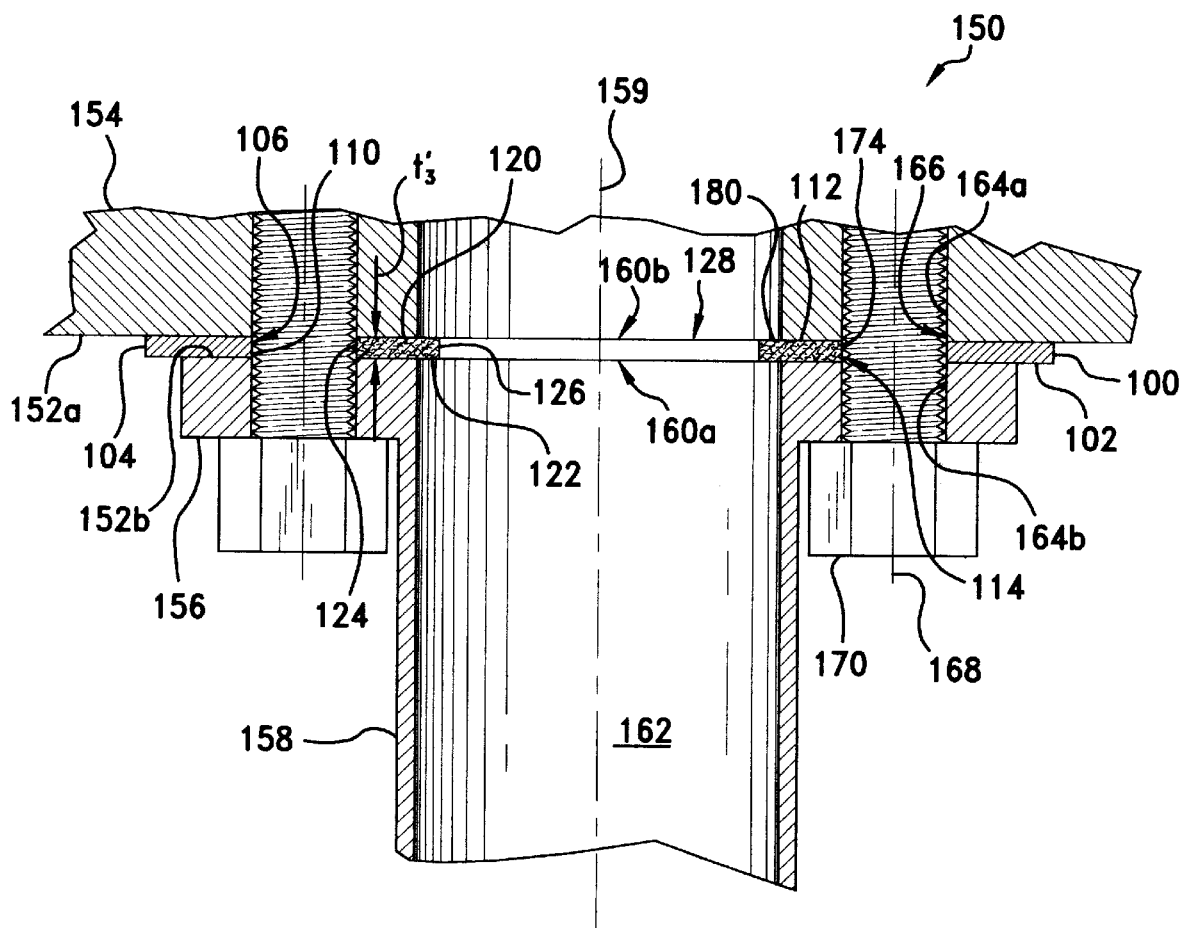
FIG. 6 is fragmentary, enlarged, cross-sectional view showing the gasket of FIG. 4 as interposed between the interface surfaces of a cylinder head and associated exhaust manifold of an internal combustion engine.

Referring next to FIG. 6, shown generally at 150 is a cross-sectional view of a representative joint assembly for gasket embodiment 100 of the present invention. Within joint assembly 150, gasket 100 of the present invention is shown as compressed between a pair of generally-planar interfaces surfaces, 152a and 152b, which are presented, respectively, by a cylinder head, 154, and the flange, 156, of a header pipe, 158, or other exhaust manifold which extends along longitudinal axis 159. As before, each of the interface surfaces 152 is formed as having at least one fluid port opening, referenced respectively at 160a and 160b, disposed in registration with a corresponding one of the fluid ports of the other interface surface for defining a fluid passageway, reference at 162, of the exhaust system. Fluid passageway 162 is of nominal inner diameter and extends along longitudinal axis 159 through pipe 158 and cylinder head 154.

Additionally defined within each of interface surfaces 152 are plurality of bores, one of which is referenced at 164a for surface 152a and at 164b for surface 152b, disposed adjacent fluid passageway 162. Each of the bores 164 is in alignment with a corresponding bore of the other surface to define a hole, one of which is referenced at 166 as extending along axis 168, configured to threadably receive an associated fastening member, one of which is shown as the head bolt referenced at 170. Bolts 170, as was aforementioned, connect interface surfaces 152 and are tightened to a predetermined torque to effect the compression of gasket 100 in a sealing engagement between the surfaces. As is shown for the throughbore referenced at 114, each of the throughbores of gasket 100 are arranged to be in coaxial registration with a corresponding one of the fastener member holes 166 for receiving one of the fastener members 170 therethrough.

Gasket 100, as before, is disposed between interface surfaces 154 with gasket opening 128 being in general coaxial registration with the corresponding fluid passageway 162 of the engine. Upon the tightening of bolts 170 to a predetermined torque, seal member 112 is compressed between interface surfaces 152 to a thickness, referenced at $t_3'$, which is equal to the thickness $t_2$ of retainer member 102. Again, a bearing portion, referenced at 180 of seal member 112 is defined to extend intermediate the inner diameter of fluid passageway 162 and the periphery 100 of aperture 106 for providing a circumferentially continuous, fluid-tight seal about the passageway. As before, seal members 112 exhibit a reduced yield stress as compared to metal retainer member 102 and, accordingly, are deformable for conforming to any irregularities between the interface surfaces of the engine. That is, as a given compressive load is applied by the tightening of bolts which fasten the interface surfaces, an increased bearing stress is provided about the fluid passageways of the engine by virtue of the reduced surface area contact of bearing portion 180 of the seal member on the interface surfaces. This increased stress is sufficient to exceed the reduced yield stress of seal members 112 for the deformation thereof effecting the fluid-tight sealing of the engine passageways.

The comparative examples which follows are illustrative of the advantages of the present invention, but should not be construed in a limiting sense.

EXAMPLES

Example 1

To confirm the precepts of the present invention, a prototype representative of the combination metal and graphite gaskets described herein was constructed as configured as a header seal for a Ford® small block V8 engine. This prototype was formed as having a 0.080-inch thick aluminum retainer member, the 1.228-inch by 1.567-inch cylinder exhaust port opening of which was sealed with a 0.110-inch thick insert of a consolidated graphite foil material (70 lb/ft³ GTCTM Graphite Foil, UCAR Carbon Company, Inc., Parma, Ohio). The pressure decay performance of this prototype was compared with the performances of three representative gaskets of conventional constructions according to the following experimental procedure.

Each of the respective gaskets was sealed under load between a parallel-plate test fixture. The load force on the gasket was provided by tightening a pair of clamping bolts of the fixture to a torque of about 225 in-lb. Nitrogen gas then was admitted into the fixture to a pressure of about 25 psi. A pressure gauge was monitored to record the pressure decay within the fixture as a function of time. Specifically, the interval was determined for the pressure within the fixture to drop from 25 psi to 20 psi as a standardized measure of the "leak down time" of the gasket. To simulate the environment within an internal combustion engine, the described testing also was performed following the exposure of each of the gaskets to a temperature of about 650° F. for four (4) hours. The following results were recorded:

TABLE 1

Leak Down Testing

| Test Specimen and Part Number | Pressure Decay Range (psi) | Leak Down Time (min) (before heating) | Leak Down Time (min) (after heating) | Comments |
|---|---|---|---|---|
| Fel Pro P/N Fel-1415[1] | 25–20 | 2.0 | 0.5 | |
| Mr. Gasket P/N 253[2] | 25–20 | 4.5 | 5 sec. | No seal after Heat exposure |

TABLE 1-continued

Leak Down Testing

| Test Specimen and Part Number | Pressure Decay Range (psi) | Leak Down Time (min) (before heating) | Leak Down Time (min) (after heating) | Comments |
|---|---|---|---|---|
| Harbor Industries P/N G-253X[3] | 25–30 | 50.0 | 4.0 | Excellent performance before heat exposure |
| Prototype Combination[4] | 25–30 | 59.0 | 59.0 | Excellent performance both before and after heat exposure |

[1]1.250-inch by 1.480-inch exhaust port size
[2]1.100-inch by 1.560-inch exhaust port size
[3]1.175-inch by 1.540-inch exhaust port size
[4]1.228-inch by 1.567-inch exhaust port size

Example 2

To further confirm the precepts of the present invention, a specimen of the prototype gasket described in Example 1 was subjected to recovery, i.e., compression set, and bolt torque retention testing. Again, the performance of this gasket was compared with the performances of three representative gaskets of conventional constructions according to the following experimental procedure.

Each of the gaskets was sealed under load between a parallel-plate test fixture. The load force on the gasket was provided by tightening a pair of clamping bolts of the fixture to a torque of about 225 in-lb using a torque wrench (Snap-On® Torqometer, Model No. TQ-25). To again simulate the conditions within the environment of an internal combustion engine, the test fixture was heated in an electric furnace (Cress, Model No. C-126) to a temperature of about 650° F. for four (4) hours, and then allowed to thermally equilibrate to room temperature.

For recovery testing, thickness measurements of the gaskets were obtained both prior to installation within the fixture and after compression. The ratio of the respective thicknesses after and before compression was calculated as the percentage recovery. For bolt torque retention testing, the fixture bolts were loosened with the torque wrench, with the ratio of final to initial bolt torque being calculated as the percentage torque retention. The following experimental results were recorded:

TABLE 2

Recovery and Retention Testing

| Test Specimen and Part Number | Percent Recovery (%) | Percent Torque Retention (%) | Comments |
|---|---|---|---|
| Fel Pro P/N Fel-1415 | 0 | 51 | Bolt torque decreased by one-half |
| Mr. Gasket P/N 253 | 0 | 0 | Seal flattened completely |
| Harbor Industries G-253X[3] | 0 | 61 | |
| Prototype Combination | 22 | 85 | Good seal recovery and torque retention |

Visual observations of the gaskets after heating revealed some oxidation and/or scorching on all of the gaskets. However, the prototype gaskets representative of the present invention exhibited less discoloration than the conventional gaskets heretofore known in the art, with no discoloration of the graphite foil being observed.

The forgoing results confirm that the percentage of torque retention varies directly with the percentage of recovery. That is, torque loss is lower when the recovery is higher and the compression set is lower. As a correlation of performance under extended periods of temperature cycling, the results also confirm that the gasket of the present invention would be expected to offer an extended service life in exhibiting a high percentage recovery and torque retention.

Thus, a unique, metal and graphite combination gasket construction for internal combustion engines and other applications is described which develops metal-to-metal contact for maintaining high bolt tension. Such construction additionally provides for good seal recovery even at relatively high temperatures.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A sealing assembly for interposition between a pair of mutually-facing, axially spaced-apart interface surfaces of an internal combustion engine, each of the interface surfaces having a plurality of fluid ports disposed in registration with a corresponding one of the fluid ports of the other interface surface for defining fluid passageways of given inner diameters therethrough, said assembly comprising:

a metal retainer member having generally planar first and second surfaces with a plurality of apertures formed therethrough, each of said apertures being configured for generally coaxial registration with a corresponding one of the fluid passageways of the engine and having a periphery defining a margin of an extent greater than the inner diameter of the corresponding fluid passageway; and a plurality of generally annular seal members each received within a corresponding one of said apertures, said seal members each having first and second radial surfaces extending intermediate an outer diametric extent of said seal member and an inner diametric extent of said seal member which inner diametric extent defines an opening of said assembly configured for generally coaxial registration with a corresponding one of the fluid passageways of the engine, said radial surfaces defining a generally circumferentially continuous bearing portion and each of said seal members being formed of a material which is compressible axially in said bearing portion between the interface surfaces for sealing about the corresponding fluid passageway of the engine.

2. The sealing assembly of claim 1 wherein said retainer member is constructed of a metal material selected from the group consisting of aluminum, steel, stainless steel, copper, brass, titanium, nickel, and alloys thereof.

3. The sealing assembly of claim 1 wherein at least a portion of the outer diametric extent of each of said seal members and at least a portion of the periphery of the corresponding aperture define, respectively, mutually-facing inner and outer surfaces, and wherein the outer surface of each of said seal members is bonded to the mutually-facing inner surface of the corresponding aperture.

4. The sealing assembly of claim 1 wherein at least a portion of the outer diametric extent of each of said seal members and at least a portion of the periphery of the corresponding aperture define, respectively, mutually-facing inner and outer surfaces, and wherein the outer surface of each of said seal members is interference fit within the mutually-facing inner surface of the corresponding aperture.

5. The sealing assembly of claim 3 or 4 wherein said mutually-facing inner and outer surfaces are generally annular.

6. The sealing assembly of claim 1 wherein the first and second surfaces of said retainer member and the radial surfaces of each of said seal members define, respectively, a first and second axial thickness therebetween, the second axial thickness of said seal members being thicker than the first axial thickness of said retainer member.

7. The sealing assembly of claim 6 wherein the second axial thickness of said seal members is compressible in said bearing portion to about the first axial thickness of said retainer member.

8. The sealing assembly of claim 1 wherein said bearing portion of each of said seal members extends intermediate the inner diameter of the corresponding passageway of the engine and the periphery of the corresponding aperture of said retainer member.

9. A joint assembly within an internal combustion engine having a cylinder head and an associated manifold, said assembly comprising:

a first interface surface of said engine presented by said cylinder head having a plurality of fluid ports;

a mutually-facing second interface surface of said engine presented by said manifold axially-spaced apart from said first interface surface and having a plurality of fluid ports, each of said fluid ports of said first and second interface surfaces being disposed in registration with a corresponding one of said fluid ports of the other interface surface for defining fluid passageways of given inner diameters therethrough; and a gasket member interposed between said first and second interface surfaces, said gasket member comprising:

a metal retainer having generally planar first and second surfaces with a plurality of apertures formed therethrough, each of said apertures being configured for generally coaxial registration with a corresponding one of said fluid passageways of said engine and having a periphery defining a margin of an extent greater than the inner diameter of the corresponding fluid passageway, and a plurality of generally annular seals each received within a corresponding one of said apertures of said retainer, said seals each having first and second radial surfaces extending intermediate an outer diametric extent of said seal and an inner diametric extent of said seal which inner diametric extent defines an opening of said gasket member registered coaxially with a corresponding one of the fluid passageways of the engine, said radial surfaces defining a generally circumferentially continuous bearing portion between the interface surfaces of the engine, and each of said seals being formed of a layer of a material which is compressed axially in said bearing portion between the interface surfaces effecting a fluid-tight sealing about the corresponding fluid passageway of the engine.

10. The joint assembly of claim 9 wherein said bearing portion of each of said seals extends intermediate the inner diameter of the corresponding passageway of the engine and the periphery of the corresponding aperture of said retainer.

11. The joint assembly of claim 9 wherein said first and second interface surfaces of the engine are presented by first and second connecting flanges of the exhaust system of the engine.

12. The joint assembly of claim 9 wherein said retainer of said gasket member is constructed of a metal material selected from the group consisting of aluminum, steel, stainless steel, copper, brass, titanium, nickel, and alloys thereof.

13. The joint assembly of claim 9 wherein at least a portion of the outer diametric extent of each of said seals of said gasket member and at least a portion of the periphery of the corresponding aperture of said retainer define, respectively, mutually-facing inner and outer surfaces, and wherein the outer surface of each of said seals is bonded to the mutually-facing inner surface of the corresponding aperture.

14. The joint assembly of claim 9 wherein at least a portion of the outer diametric extent of each of said seals of said gasket member and at least a portion of the periphery of the corresponding aperture of said retainer define, respectively, mutually-facing inner and outer surfaces, and wherein the outer surface of each of said seals is interference fit within mutually-facing inner surface of the corresponding aperture.

15. The joint assembly of claim 13 or 14 wherein said mutually-facing inner and outer surfaces are generally annular.

16. The joint assembly of claim 9 wherein the first and second surfaces of said retainer of said gasket member and the radial surfaces of each of said seals of said gasket member define, respectively, a first and second axial thickness therebetween, the second axial thickness of said seals being thicker in an uncompressed state than the first axial thickness of said retainer.

17. The joint assembly of claim 16 wherein the second axial thickness of said seals is compressed in said bearing portion to about the first axial thickness of said retainer.

18. The joint assembly of claim 9 wherein said first interface surface is presented by a cylinder head of said engine and said second interface surface is presented by an associated exhaust manifold.

19. A sealing assembly for interposition between a pair of mutually-facing, axially spaced-apart interface surfaces of an internal combustion engine, each of the interface surfaces having one or more fluid ports disposed in registration with a corresponding one of the fluid ports of the other interface surface for defining fluid passageways of given inner diameters therethrough, and each having one or more bores disposed generally adjacent a corresponding one of the fluid passageways and in registration with a corresponding one of the bores of the other interface surface for defining a hole configured to receive an associated fastener member, said assembly comprising:

a metal retainer member having generally planar first and second surfaces with one or more apertures formed therethrough, each of said apertures being configured for generally coaxial registration with a corresponding one of the fluid passageways of the engine and having a periphery defining a margin of an extent greater than the inner diameter of the corresponding fluid passageway; and one or more generally annular seal members each received within a corresponding one of said apertures, said seal members each having first and second radial surfaces extending intermediate an outer diametric extent of said seal member and an inner diametric extent of said seal member which inner diametric extent defines an opening of said assembly configured for generally coaxial registration with a corresponding one of the fluid passageways of the engine, said radial surfaces defining a generally circumferentially continuous bearing portion and each of said seal members being formed of a material which is compressible axially in said bearing portion between the interface surfaces for sealing about the corresponding fluid passageway of the engine, said assembly further including one or more throughbores configured for generally coaxial registration with a corresponding one of the fastener member holes, a portion of each of said throughbores being defined by the margin of a corresponding one of said retainer member apertures and the remainder thereof being defined by the outer diametric extent of a corresponding one of said seal members.

20. A joint assembly within an internal combustion engine having an exhaust system, said assembly comprising:

a first interface surface being presented by a first connecting flange of the exhaust system of the engine and having one or more fluid ports;

a mutually-facing second interface surface axially-spaced apart from said first interface surface, said second interface surface being presented by a second connecting flange of the exhaust system of the engine and having one or more fluid ports, each of said fluid ports of said first and second interface surfaces being disposed in registration with a corresponding one of said fluid ports of the other interface surface for defining fluid passageways of given inner diameters therethrough;

a gasket member interposed between said first and second interface surfaces, said gasket member comprising:

a metal retainer having generally planar first and second surfaces with one or more apertures formed therethrough, each of said apertures being configured for generally coaxial registration with a corresponding one of said fluid passageways of said engine and having a periphery defining a margin of an extent greater than the inner diameter of the corresponding fluid passageway, and one or more generally annular seals each received within a corresponding one of said apertures of said retainer, said seals each having first and second radial surfaces extending intermediate an outer diametric extent of said seal and an inner diametric extent of said seal which inner diametric extent defines an opening of said gasket member registered coaxially with a corresponding one of the fluid passageways of the engine, said radial surfaces defining a generally circumferentially continuous bearing portion between the interface surfaces of the engine, and each of said seals being formed of a layer of a lamellar graphite sheet material which is compressed axially in said bearing portion between the interface surfaces effecting a fluid-tight sealing about the corresponding fluid passageway of the engine; and a third interface surface interposed between one of said first and second interface surfaces and one of said seals of said gasket member, said third interface surface being present from a connecting flange received concentrically within a corresponding one of said first and second connecting flanges.

21. A joint assembly within an internal combustion engine having an exhaust system, said assembly comprising:

a first interface surface being presented by a first connecting flange of the exhaust system of the engine and having one or more fluid ports;

a mutually-facing second interface surface axially-spaced apart from said first interface surface, said second interface surface being presented by a second connecting flange of the exhaust system of the engine and having one or more fluid ports, each of said fluid ports of said first and second interface surfaces being disposed in registration with a corresponding one of said fluid ports of the other interface surface for defining fluid passageways of given inner diameters therethrough;

a gasket member interposed between said first and second interface surfaces, said gasket member comprising:

a metal retainer having generally planar first and second surfaces with one or more apertures formed therethrough, each of said apertures being configured for generally coaxial registration with a corresponding one of said fluid passageways of said engine and having a periphery defining a margin of an extent greater than the inner diameter of the corresponding fluid passageway, and one or more generally annular seals each received within a corresponding one of said apertures of said retainer, said seals each having first and second radial surfaces extending intermediate an outer diametric extent of said seal and an inner diametric extent of said seal which inner diametric extent defines an opening of said gasket member registered coaxially with a corresponding one of the fluid passageways of the engine, said radial surfaces defining a generally circumferentially continuous bearing portion between the interface surfaces of the engine, and each of said seals being formed of a layer of a lamellar graphite sheet material which is compressed axially in said bearing portion between the interface surfaces effecting a fluid-tight sealing about the corresponding fluid passageway of the engine; and a third interface surface interposed between one of said first and second interface surfaces and one of said seals of said gasket member, wherein the first and second surfaces of said retainer of said gasket member and the radial surfaces of each of said seals of said gasket member define, respectively, a first and second axial thickness therebetween, the second axial thickness of said seals being thinner in an uncompressed state than the first axial thickness of said retainer to accommodate the thickness of said third interface surface.

22. A joint assembly within an internal combustion engine having an exhaust system, said assembly comprising:

a first interface surface being presented by a first connecting flange of the exhaust system of the engine and having one or more fluid ports;

a mutually-facing second interface surface axially-spaced apart from said first interface surface, said second interface surface being presented by a second connecting flange of the exhaust system of the engine and having one or more fluid ports, each of said fluid ports of said first and second interface surfaces being disposed in registration with a corresponding one of said fluid ports of the other interface surface for defining fluid passageways of given inner diameters therethrough;

a gasket member interposed between said first and second interface surfaces, said gasket member comprising:

a metal retainer having generally planar first and second surfaces with one or more apertures formed therethrough, each of said apertures being configured for generally coaxial registration with a corresponding one of said fluid passageways of said engine and having a periphery defining a margin of an extent greater than the inner diameter of the corresponding fluid passageway, and one or more generally annular seals each received within a corresponding one of said apertures of said retainer, said seals each having first and second radial surfaces extending intermediate an outer diametric extent of said seal and an inner diametric extent of said seal which inner diametric extent defines an opening of said gasket member registered coaxially with a corresponding one of the fluid passageways of the engine, said radial surfaces defining a generally circumferentially continuous bearing portion between the interface surfaces of the engine, and each of said seals being compressed axially in said bearing portion between the interface surfaces effecting a fluid-tight sealing about the corresponding fluid passageway of the engine; and a third interface surface interposed between one of said first and second interface surfaces and one of said seals of said gasket member, wherein the first and second surfaces of said retainer of said gasket member and the radial surfaces of each of said seals of said gasket member define, respectively, a first and second axial thickness therebetween, the second axial thickness of said seals being thinner in an uncompressed state than the first axial thickness of said retainer to accommodate the thickness of said third interface surface.

23. A sealing assembly for interposition between a pair of mutually-facing, axially spaced-apart interface surfaces of an internal combustion engine, each of the interface surfaces having one or more fluid ports disposed in registration with a corresponding one of the fluid ports of the other interface surface for defining fluid passageways of given inner diameters therethrough, said assembly comprising:

a metal retainer member having generally planar first and second surfaces with one or more apertures formed therethrough and defining a first axial thickness therebetween, each of said apertures being configured for generally coaxial registration with a corresponding one of the fluid passageways of the engine and having a periphery defining a margin of an extent greater than the inner diameter of the corresponding fluid passageway; and one or more generally annular seal members each received within a corresponding one of said apertures, said seal members each having first and second radial surfaces defining a second axial thickness therebetween thinner than the first axial thickness of said retainer member, and extending intermediate an outer diametric extent of said seal member and an inner diametric extent of said seal member which inner diametric extent defines an opening of said assembly configured for generally coaxial registration with a corresponding one of the fluid passageways of the engine, said radial surfaces defining a generally circumferentially continuous bearing portion and each of said seal members being formed of a layer of a lamellar graphite sheet material which is compressible axially in said bearing portion between the interface surfaces for sealing about the corresponding fluid passageway of the engine.

24. A sealing assembly for interposition between a pair of mutually-facing, axially spaced-apart interface surfaces of an internal combustion engine, each of the interface surfaces having one or more fluid ports disposed in registration with a corresponding one of the fluid ports of the other interface surface for defining fluid passageways of given inner diameters therethrough, and each having one or more bores disposed generally adjacent a corresponding one of the fluid passageways and in registration with a corresponding one of the bores of the other interface surface for defining a hole configured to receive an associated fastener member, said assembly comprising:

a metal retainer member having generally planar first and second surfaces with one or more apertures formed therethrough, each of said apertures being configured for generally coaxial registration with a corresponding one of the fluid passageways of the engine and having a periphery defining a margin of an extent greater than the inner diameter of the corresponding fluid passageway; and one or more generally annular seal members each received within a corresponding one of said apertures, said seal members each having first and second radial surfaces extending intermediate an outer diametric extent of said seal member and an inner diametric extent of said seal member which inner diametric extent defines an opening of said assembly configured for generally coaxial registration with a corresponding one of the fluid passageways of the engine, said radial surfaces defining a generally circumferentially continuous bearing portion and each of said seal members being formed of a layer of a lamellar graphite sheet material which is compressible axially in said bearing portion between the interface surfaces for sealing about the corresponding fluid passageway of the engine, said assembly further comprising one or more throughbores each configured for generally coaxial registration with a corresponding one of the fastener member holes, a portion of each of said throughbores being defined by the margin of a corresponding one of said retainer member apertures and the remainder thereof being defined by the outer diametric extent of a corresponding one of said seal members.

25. A joint assembly within an internal combustion engine comprising:

a first interface surface of said engine having one or more fluid ports;

a mutually-facing second interface surface of said engine axially-spaced apart from said first interface surface and having one or more fluid ports, each of said fluid ports of said first and second interface surfaces being disposed in registration with a corresponding one of said fluid ports of the other interface surface for defining fluid passageways of given inner diameters therethrough; and a gasket member interposed between said first and second interface surfaces, said gasket member comprising:

a metal retainer having generally planar first and second surfaces with one or more apertures formed therethrough and defining a first axial thickness therebetween, each of said apertures being configured for generally coaxial registration with a corresponding one of said fluid passageways of said engine and having a periphery defining a margin of an extent greater than the inner diameter of the corresponding fluid passageway, and one or more generally annular seals each received within a corresponding one of said apertures of said retainer, said seals each having first and second radial surfaces defining a second axial thickness therebetween thinner in an uncompressed state than the first axial thickness of said retainer, and extending intermediate an outer diametric extent of said seal and an inner diametric extent of said seal which inner diametric extent defines an opening of said gasket member registered coaxially with a corresponding one of the fluid passageways of the engine, said radial surfaces defining a generally circumferentially continuous bearing portion between the interface surfaces of the engine, and each of said seals being formed of a layer of a lamellar graphite sheet material which is compressed axially in said bearing portion between the interface surfaces effecting a fluid-tight sealing about the corresponding fluid passageway of the engine.

26. A joint assembly within an internal combustion engine comprising:

one or more fastener members;

a first interface surface of said engine having one or more fluid ports and one or more bores;

a mutually-facing second interface surface of said engine axially-spaced apart from said first interface surface, said second interface surface having one or more fluid ports, each of said fluid ports of said first and second interface surfaces being disposed in registration with a corresponding one of said fluid ports of the other interface surface for defining fluid passageways of given inner diameters therethrough, and said second interface surface having one or more bores disposed generally adjacent a corresponding one of the fluid passageways and in registration with a corresponding one of the bores of the other interface surface for defining a hole receiving an associated said fastener member; and a gasket member interposed between said first and second interface surfaces, said gasket member comprising:

a metal retainer having generally planar first and second surfaces with one or more apertures formed therethrough, each of said apertures being configured for generally coaxial registration with a corresponding one of said fluid passageways of said engine and having a periphery defining a margin of an extent greater than the inner diameter of the corresponding fluid passageway, and one or more generally annular seals each received within a corresponding one of said apertures of said retainer, said seals each having first and second radial surfaces extending intermediate an outer diametric extent of said seal and an inner diametric extent of said seal which inner diametric extent defines an opening of said gasket member registered coaxially with a corresponding one of the fluid passageways of the engine, said radial surfaces defining a generally circumferentially continuous bearing portion between the interface surfaces of the engine, and each of said seals being formed of a layer of a lamellar graphite sheet material which is compressed axially in said bearing portion between the interface surfaces effecting a fluid-tight sealing about the corresponding fluid passageway of the engine, said gasket member further including one or more throughbores each registered generally coaxially with a corresponding one of the fastener member holes and receiving an associated said fastener member therethrough, a portion of each of said throughbores being defined by the margin of a corresponding one of the apertures of said retainer and the remainder thereof being defined by the outer diametric extent of a corresponding one of said seals.

\* \* \* \* \*